Sept. 22, 1925.
G. D. OLDS, JR
1,554,516
METHOD OF EXTRACTING COCONUT MEAT
Filed July 17, 1920
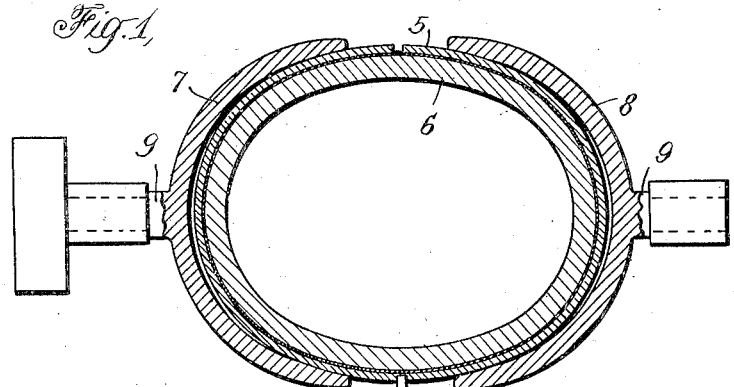
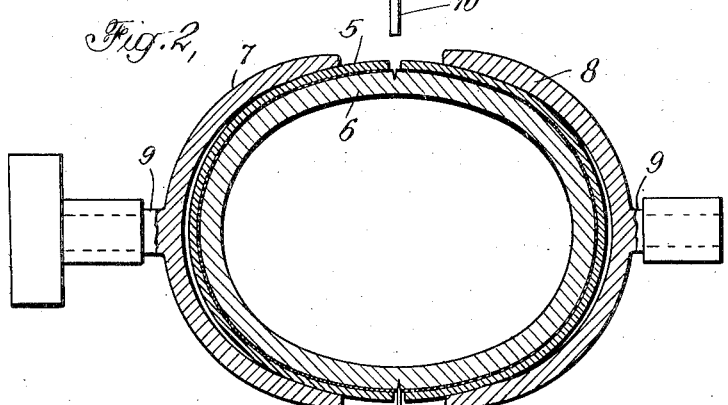
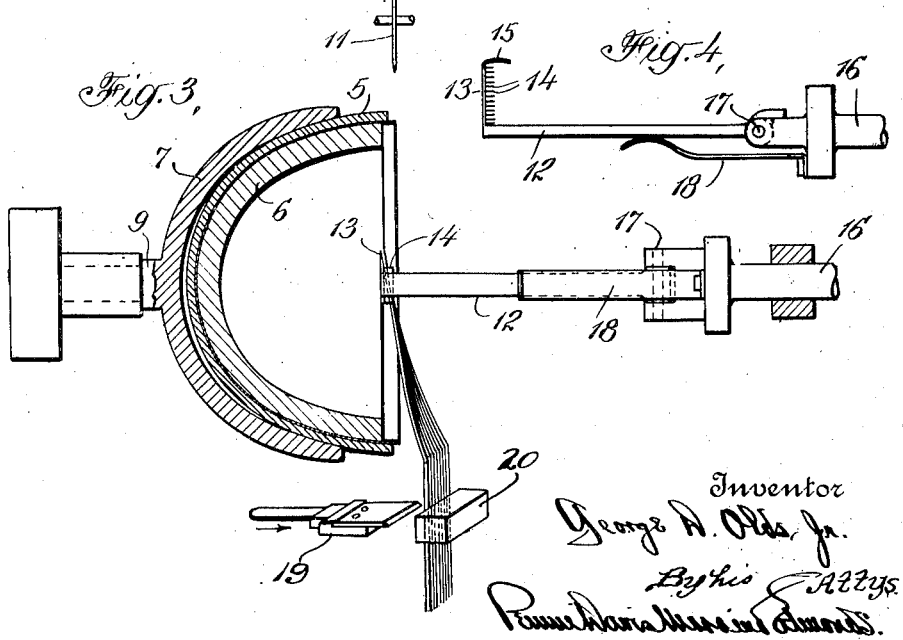

Patented Sept. 22, 1925.

1,554,516

UNITED STATES PATENT OFFICE.

GEORGE D. OLDS, JR., OF BROOKLYN, NEW YORK.

METHOD OF EXTRACTING COCONUT MEAT.

Application filed July 17, 1920. Serial No. 397,011.

*To all whom it may concern:*

Be it known that I, GEORGE D. OLDS, Jr., a citizen of the United States, residing at 8607 Colonial Road, Brooklyn, in the county of Kings, State of New York, have invented certain new and useful Improvements in Methods of Extracting Coconut Meat; and I do hereby declare the following to be a full, clear, and exact description of the invention, such as will enable others skilled in the art to which it appertains to make and use the same.

This invention relates to the preparation of coconut meat for marketing and is directed to the provision of an improved method of opening coconut shells and extracting the coconut meat in shredded form suitable for packaging for sale.

The object of the invention is to provide a method of preparing coconut meat for market which is to a considerable extent less costly than the methods which have been employed commercially heretofore. By the method constituting this invention, not only is this object of reducing the cost of preparing coconut meat attained, but also the process results in the preparation of the meat in a more nutritious and more stable form.

The process now employed commercially on a large scale in the preparation of coconut meat involves four main steps, first, steaming, second, removing or opening the shell, third, shaving off the skin, and fourth, shredding.

In the first of these operations, the whole nut with the husk or rind removed is subjected to the action of steam for a considerable period of time for the purpose of shrinking the meat away from the shell to facilitate the operations of breaking the shell and shaving the skin off of the meat. This operation is a costly one, and apart from its cost, is objectionable for the reason that the steaming drives off some of the essential oil in the meat and makes the meat more liable to become rancid.

After the steaming of the whole nut, the shell is removed in what is generally known as the "opening" process. This work requires skilled labor and adds materially to the cost of producing the prepared coconut meat.

After the shell is removed, it is necessary to shave off the thin skin which is present in the whole nut between the shell and the meat. This skin adheres closely to the meat and can be removed only in a cutting or shaving operation. This requires skilled labor and is a very costly step in the complete process. Furthermore, it is impossible to shave off the skin completely without removing a considerable portion of the meat. The loss of meat incident to the operation of shaving off the skin is usually 12% to 15% and sometimes runs as high as 20%. The meat so shaved off with the skin is wasted except to the extent that the oil may be extracted from it.

After the skin has been shaved off of the meat, the latter is subjected to any common form of shredding operation by feeding it against a cutter which is rotated at high speed.

The present invention involves the provision of a method of preparing shredded coconut which is an improvement upon the process outlined above as heretofore used commercially on a large scale. By the improved process, the cost of the operation is greatly reduced, an increased amount of meat is produced as the loss incident to the shaving operation is practically eliminated and the shredded coconut meat prepared by the improved process is of a superior quality as it is less liable to become rancid and contains more of the nutritious oil. Broadly stated, the improved process involves the elimination of the first of the four steps above referred to, that is, the steaming of the whole nuts, and the combining in one operation of the three steps of removing the shell, shaving off the skin and shredding the meat.

In accordance with the improved process, the whole nut, without any preliminary steaming operation, is cut open in a rotary cutting operation to form two halves of substantially hemispherical form, then each of these halves is mounted in a suitable holder by which it can be rotated, and, while it is rotated, a shredding knife is advanced into contact with the meat in the shell. This shredding knife is specially constructed to include a part which is adapted to bear against the interior of the skin of the nut and guide the knife proper in its movement into the shell of the nut so as to insure removal of all of the meat without taking off any of the skin or shell. Furthermore, the knife is so constructed that the meat is taken out in the form of shreds which may be of any desired cross-sectional size and of any desired length.

Preferably a nut which is to be treated in accordance with the improved method is gripped between two cup-shaped chucks and while so held is rotated at a high speed while a cutting tool is advanced toward the middle of the nut. This cutting tool is moved forward so as to cut a groove in the periphery of the nut, preferably extending through the skin of the nut and just entering the meat. It is undesirable to continue the cutting action of this tool far into the meat as the sawdust produced by the cutting tool would adhere to the meat and some of it would appear in the final product of the operation. After the shell has been grooved thus, a cutting tool which has a knife edge and which therefore does not produce sawdust, is moved into contact with the meat to cut through to the interior of the nut. In this way two halves of the coconut are produced, each held in one of the cup-shaped chucks. Then each of these halves while so held is rotated at substantial speed while the shredding tool is advanced toward the open side of the half nut. The apparatus for performing this shredding operation may be in the general form of a lathe, the head stock carrying the chuck in which the half nut is held and the tool holder carrying the shredding tool. This tool is preferably mounted for movement about a pivot and is provided with means for exerting a yielding pressure on it by means of a spring or a weight so that the tool will be subjected at all times to a pressure tending to turn it about its pivot in a direction to carry its cutting end outwardly from the axis of rotation. In this way the guiding element of the shredding tool will be held at all times with a yielding pressure against the interior of the skin or shell of the nut, thereby enabling the cutting tool to remove and shred all of the meat. During the continuance of the shredding operation, the tool and the half nut are moved relatively so that the cutting end of the tool is advanced steadily into the shell, and by reason of the pivotal mounting of the tool and the pressure to which the tool is subjected to turn it about its pivot, the cutting end of the tool follows the curvature of the interior of the shell from the edge around to the center. The shredding tool is provided with a cutting edge for making a cut transverse to the axis of rotation and this edge is at least as long as the width of the meat. In addition, a plurality of short transverse cutting edges rise from this long cutting edge so that as a thin wide strip of the meat is cut off by the long cutting edge, the short transverse edges sever the flat strip into a plurality of thin shreds. The spacing of the short transverse cutting edges preferably corresponds to the thickness of the strip of meat taken off by the long cutting edge so that the shreads are approximately square in cross-section. These shreads may be made of any desired length but preferably means are provided for cutting the shreds into very short lengths as that is the better form from the standpoint of the user.

I have illustrated diagrammatically the steps in my improved process in the accompanying drawing. In this drawing, Fig. 1 shows a coconut mounted in two rotary chucks and a cutting tool for forming a peripheral groove in the nut; Fig. 2 shows the same arrangement of parts with a different cutting tool, the nut having been provided with the peripheral groove in accordance with Fig. 1 so that it is in readiness for severing; Fig. 3 illustrates half of the nut held in a rotary chuck and a cutting tool being advanced into the nut to extract and shred the meat; and Fig. 4 is a view of the cutting tool shown in Fig. 3, the latter figure showing the tool in elevation and Fig. 4 showing it in plan.

Referring to these drawings, Figs. 1 and 2 shows a whole coconut from which the husk or rind has been removed. The nut consists of the shell 5 and the meat 6. Between these two is a thin fibrous skin which adheres to the meat 6. This whole nut, without any preliminary steaming operation, is gripped between two cup-shaped holders or chucks indicated at 7 and 8. These chucks may be of any suitable form adapted for gripping the parts of the nut enclosed by them. They may be provided with threads or spurs which will enter the shell enough to take secure hold. Each chuck 7 is provided with a spindle 9 adapted to be received in any suitable form of holder and the two chucks with the nut gripped between them are adapted to be rotated in any suitable form of machine.

While the nut is so rotated, it is subjected to a cutting operation for dividing it into two halves. This is preferably done in two steps, one consisting in grooving the shell all the way through and that being followed by a cutting operation which severs the nut. In Fig. 1 a rotary cutter 10 is shown as being advanced toward the nut while the latter is rotated by the chucks 7 and 8. This cutter enters the shell 5 to form a peripheral groove in the shell as is indicated in Fig. 1. The cutter 10 is moved forward until the shell is grooved through but preferably its forward movement is discontinued before the cutter enters the meat to any considerable extent.

After the shell is so grooved, the grooving cutter 10 is removed and in its place a cutter 11 of the form shown in Fig. 2 is brought into contact with the nut. This cutter has a knife edge so that it produces no sawdust.

It is advanced through the meat so as to completely sever the nut into two halves.

Following this, each half of the nut is subjected to the extracting and shredding operation. Preferably this is done without removing the half of the nut from its chuck or holder and it may be done without removing the chuck or holder from the machine in which the severing operation was conducted. For the purpose of extracting and shredding the meat, the half nut is rotated and at the same time a shredding tool is advanced into its open end. This shredding tool is illustrated diagrammatically at 12 in Figs. 3 and 4. It consists of an arm pivoted at one end and carrying a cutter at its free end. This cutter has a cutting edge 13 disposed transverse to the axis of rotation of the chuck 7, one surface of the cutter lying in a plane transverse to the axis of rotation, and the other surface being at a slight incline thereto. Rising from the inclined surface are a plurality of short transverse parallel cutting edges 14. At the end of the series of short transverse cutting edges 14 is a guide wall 15, the outer surface of which is adapted to bear against the interior of the shell and skin of the nut whereby the tool will be guided properly during the course of its advancing movement into the shell. The tool 12 is mounted upon a support 16 in such a manner as to permit its cutting edge to be moved transverse to the axis of rotation as may be necessary to extract all of the meat from the shell. In the drawings, the tool is shown as pivoted upon the support 16 at 17. Also, the tool is subjected to a yielding pressure in any suitable manner to carry its cutting elements outwardly and hold them outward from the axis of rotation far enough to insure the extraction of all of the meat. In Figs. 3 and 4, a spring 18 is shown as secured to the support 16 and pressing upon the cutter 12 so as to turn it about its pivot 17.

After the nut has been divided into two halves, the tool 12 is advanced toward the open end of the half held by the chuck 7 in the manner indicated in Fig. 3 and the chuck is rotated at substantial speed. The operator directs the advancing movement of the tool 12 so that the cutting edge 13 will be caused to engage the wall of meat 6 throughout the entire width thereof, and to insure that the meat will be engaged over its entire width, the guiding wall 15 of the tool is placed in contact with the interior wall of the shell 5 and the skin thereon. After the tool is so positioned it may be advanced into the open end of the shell steadily and it will be guided properly during this advancing movement by the shell and the spring 18. The spring always forces the free end of the cutter outwardly with a pressure sufficient to insure that the guiding surface 15 will be in contact with the interior surface of the shell and skin, but this pressure is so light that the curvature of the shell will suffice to move the free end of the tool inwardly against the tension of the spring as the cutter is advanced into the shell. During this advance movement of the cutter, the edge 13 thereof takes off a strip of the meat 6 of the half nut of a thickness regulated by the rate of advancing movement of the cutter and this strip is cut by the short transverse cutting edges 14 into a plurality of narrow shreds. Preferably the tool 12 and the chuck 7 are moved toward each other automatically so that their relative movement will be a steady one throughout the shredding operation. Therefore, the thickness of the strip taken off by the cutting edge 13 will be substantially constant; preferably its thickness is equal to the width of the spaces between the transverse cutting edges 14 and the shreds of meat are therefore square in cross-section. The short transverse cutting edges, instead of being set back from the long cutting edge 13, may be coincident with it or may project forward of it; for some purposes, a slight projection of the cutting edges 14 forward of the long edge 13 is of advantage. The shreds delivered from the cutting tool may be severed into lengths suitable for commercial distribution by means of any appropriate cutting mechanism, as, for instance, by means of a reciprocating knife 19 and a cutting block 20. The shreds coming from the tool pass between the block and the knife, and the knife is reciprocated at such a rate relative to the action of the cutting tool that the shreds are severed in the desired lengths. The cutting tool illustrated forms a convenient automatic means for performing the severing operation, although the latter may, of course, be carried on by hand, if desired. It will be understood that the drawings referred to are diagrammatic only; it is possible to practice the process with machinery which is to a very large extent automatic in its operation, and to the extent that it is automatic, the cost of conducting the operation is reduced.

It will be appreciated that in extracting and shredding coconut in accordance with the method above described, it is unnecessary to subject the nuts to a steaming operation as has been essential in the method heretofore followed, and furthermore, the succeeding steps of the process as conducted heretofore are supplanted by a single operation which results in extracting the meat in the form of shreds. As a result of this, the cost of preparing shredded coconut in accordance with this process is materially less than that incident to the process heretofore followed both by reason of the reduction of the labor cost and by reason of the elimination of the loss of meat in the shaving operation, and furthermore, the meat is of a superior quality by reason of not having been subjected to steam.

I claim:

1. The process of extracting coconut meat which consists in causing relative rotation of a coconut shell containing meat and a cutting tool, moving the tool and shell relatively so that the cutting edge of the tool enters the shell and applying a yielding pressure to the tool to move its cutting edge away from the axis of rotation whereby the cutting edge of the tool follows the curvature of the shell as it advances.

2. The process of extracting coconut meat which consists in dividing a coconut into two parts, gripping one of the parts and rotating it, advancing a cutting tool into the open end of the part of the nut while rotating the latter to cut and extract the meat, and pressing the cutting end of the tool outwardly from the axis of rotation with a yielding pressure whereby the cutting edge of the tool follows the curvature of the interior of the shell and cuts the meat therefrom.

3. The process of extracting coconut meat which consists in dividing a coconut into two parts, gripping one of the parts and rotating it and advancing into the open end of the rotating part a cutting tool which has a cutting edge substantially transverse to the axis of rotation and a plurality of cutting edges which are transverse to said edge whereby the meat of the nut is cut from the shell in shreds by the said cutting edges.

4. The process of extracting coconut meat which consists in dividing a coconut into two parts, gripping one of the parts and rotating it and advancing into the open end of the rotating part a cutting tool which has a cutting edge substantially transverse to the axis of rotation and a plurality of cutting edge which are transverse to said edge whereby the meat of the nut is cut from the shell in shreds by the said cutting edges, and pressing the cutting end of the tool outwardly from the axis of rotation with a yielding pressure to cause it to follow the curvature of the shell as it advances.

5. The process of extracting coconut meat which consists in causing relative rotation of a cutting tool and a coconut shell containing meat, moving the tool and shell relatively so that the cutting edge of the tool enters the shell and removes the meat therefrom in the form of long shreds and severing the long shreds into short lengths.

In testimony whereof I affix my signature.

GEORGE D. OLDS, Jr.